United States Patent [19]

Nomura et al.

[11] Patent Number: 4,636,136

[45] Date of Patent: Jan. 13, 1987

[54] APPARATUS FOR OPENING AND CLOSING A VEHICLE DOOR WHICH IS LOCATED IN A LINE FOR MANUFACTURING A VEHICLE

[75] Inventors: Iwao Nomura, Kasugai; Takayuki Masuyama, Okazaki; Yasuo Tanigawa; Hirofumi Hasimoto, both of Toyota, all of Japan

[73] Assignee: Toyota Jidosha Kabushiki Kaisha, Aichi, Japan

[21] Appl. No.: 616,235

[22] Filed: Jun. 1, 1984

[30] Foreign Application Priority Data

Jun. 8, 1983 [JP] Japan .............................. 58-102300

[51] Int. Cl.[4] .............................................. B66C 1/00
[52] U.S. Cl. ............................. 414/730; 414/744 A; 414/684.3; 901/31; 901/44; 292/288; 292/289; 212/166
[58] Field of Search ............... 414/744 R, 744 A, 730, 414/387, 684.3; 212/166; 901/31, 43, 44, 6, 7, 8; 49/334; 73/849, 851; 118/323; 292/292, 296, 288, 289, 144, 175; 70/14

[56] References Cited

U.S. PATENT DOCUMENTS

| | | | |
|---|---|---|---|
| 2,518,207 | 8/1950 | Wagner | 292/175 |
| 4,121,382 | 10/1978 | Dietrich et al. | 49/334 |
| 4,308,691 | 1/1982 | Horn | 49/334 X |
| 4,342,535 | 8/1982 | Bartlett et al. | 901/31 X |
| 4,423,999 | 1/1984 | Choly | 414/730 X |
| 4,489,640 | 12/1984 | Olson | 49/334 X |
| 4,498,414 | 2/1985 | Kiba et al. | 118/323 X |

OTHER PUBLICATIONS

Technical Paper—"N/C Robot System for Automotive Painting and Sealing", 1982.

*Primary Examiner*—Robert J. Spar
*Assistant Examiner*—Jonathan D. Holmes
*Attorney, Agent, or Firm*—Parkhurst & Oliff

[57] ABSTRACT

An apparatus for automatically opening and closing a door of a vehicle body which is transferred by a conveyor or is stopped at a predetermined position in a manufacturing process. The apparatus accurately control the opened angle of the door with the guidance of the combination between an engagement member and an opening thereof.

9 Claims, 11 Drawing Figures

APPARATUS FOR OPENING AND CLOSING A VEHICLE DOOR WHICH IS LOCATED IN A LINE FOR MANUFACTURING A VEHICLE

BACKGROUND OF THE INVENTION

The present invention relates to an appparatus for automatically opening and closing a door of a vehicle body which is located in a manufacturing process in a plant.

In a process for manufacturing a vehicle in a plant, it is sometimes necessitated to automatically open and close a door of a vehicle body. For instance, an automatic opening and closing operation of a vehicle door is necessitated when an inside of a door is painted in a vehicle body painting process. In this circumstance, a door lock device is conventionally mounted on a vehicle door to inhibit an inadvertent opening of the vehicle door, occurred at the time when a vehicle body is transferred by a conveyor. However, a door lock device has to be unlocked before a vehicle door opens. In general, a robot or a special purpose device unlocks a door lock device to open a vehicle door. When a robot or a special purpose device unlocks a door lock device mounted on a vehicle door, an error in position of a transferred vehicle body occurs by the distance within plus or minus 20 mm at the place between an actual transferred position and a predetermined position of a vehicle body in a process for manufacturing a vehicle. Hence, such a robot or a special purpose device includes a position sensor therein, thereby sensing the actual positions of a door lock device and a vehicle door to unlock the door lock device and open and close the vehicle door. However, an apparatus for automatically opening and closing a vehicle door costs a lot. Further, an inaccurate operation of a sensor or a special purpose device may cause the automatic apparatus to strike against a door lock device or a vehicle door, thereby resulting in a damage to them.

SUMMARY OF THE INVENTION

The present invention was made in view of the foregoing back ground and to overcome the foregoing drawbacks. It is accordingly an object of this invention to provide an apparatus for automatically opening and closing a vehicle door, which costs relatively little and is reliable.

To attain the above objects, an apparatus according to the present invention comprises:

a bracket detachably mounted on a door;

a lock member mounted on the bracket, the lock member being slide between a first position where the door is regulated to open by a predetermined angle, in association with the vehicle body, and a second position where the door is allowed to open;

a biasing means for biasing the lock member toward the first position;

an actuating device having an actuating member which automatically operates the lock member and the door to open or close the door;

a first engagement member connected to the lock member at one end thereof, the first engagement mmber transmitting the movement of the actuating member to the lock member and the door; and a second engagement member connected to the actuating member at one end thereof, the second engagement member engaging with the first engagement member with a clearance greater than an estimated maximum error distance defined between the actuating member and the vehicle body.

BRIEF DESCRIPTION OF THE DRAWINGS

The above objects, features and advantages of the present invention will become more apparent from the following description of the preferred embodiments taken in conjunction with the accompanying drawings, wherein.

DETAILED DESCRIPTION OF THE PREFERRED EMBODIMENTS

The present invention is described in detail with reference to the accompanying drawings which illustrate different embodiments of the present invention.

Figure 1:
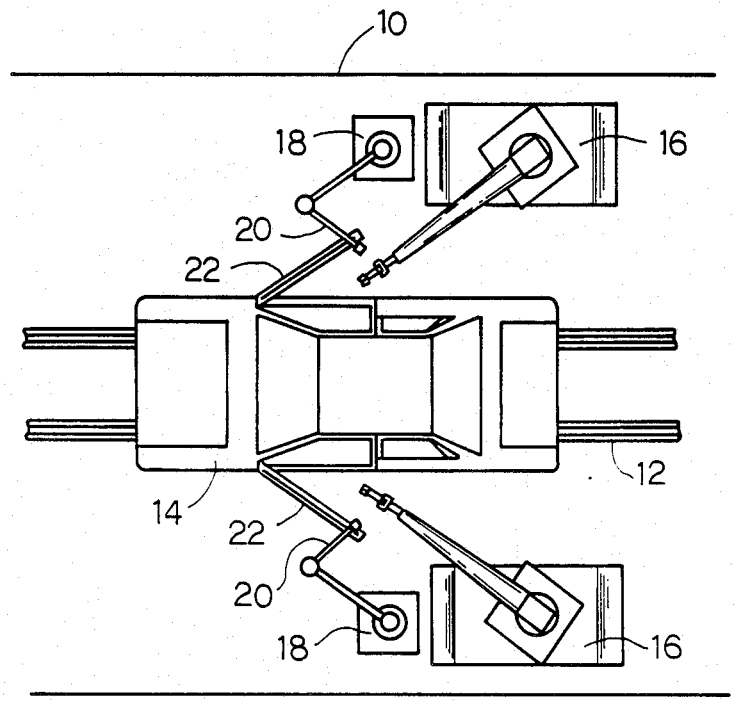
FIG. 1 is a plan view illustrating a part of a painting process in which an apparatus according to the present invention is employed.
Figure 2:
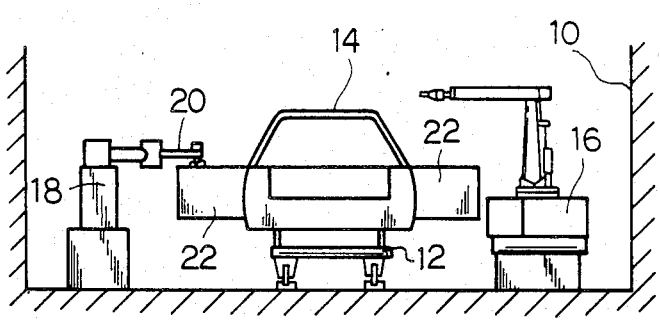
FIG. 2 is a side view illustrating a part of a painting process in which an apparatus according to the present invention is employed.

FIGS. 1 and 2 show a part of a painting process in which an apparatus according to a first embodiment of the present invention is employed. A conveyor 12 is provided at a position within a painting booth 10 in order to transfer a vehicle body. The conveyor 12 extends in the longitudinal direction of the painting booth 10, and intermittently transfers a vehicle body by a predetermined distance. Painting robots 16 and actuating devices 18 are provided on the both sides of the conveyor 12. The painting robot 16 and the actuating device 18 have memory circuits which instruct a robot arm 20 to unlock a door lock device for opening and closing the vehicle door 22. According to the present embodiment, as the conveyor 12 intermittently stops the movement of the vehicle body 14 and intermittently holds the vehicle body 14 at a predetermined position during a predetermined amount of time, the painting robot 16 and the actuating device 18 are installed on predetermined positions within the painting booth 10. If the conveyor 12 always transfers the vehicle body 14 at a constant speed, the painting robot 16 and the actuating device 18 are designed to move and follow the conveyor 12.

Figure 3:
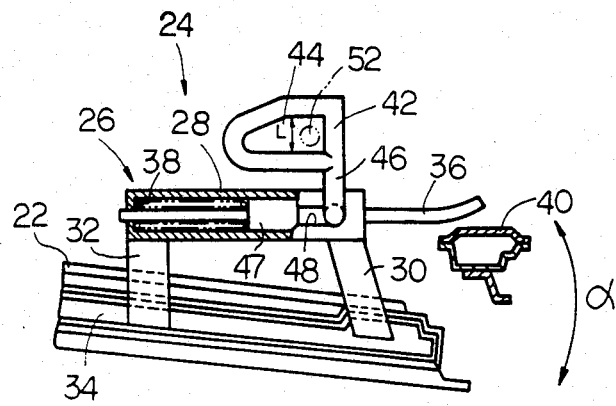
FIG. 3 is a partial broken view illustrating a door lock device which is employed in an apparatus according to a first embodiment of the present invention.

A door lock device 24 as shown in FIG. 3, is to be mounted on the vehicle door 22. A worker mounts the door lock device 24 on the vehicle door 22 at the entrance of the painting booth 10, and dismounts the door lock device 24 from the vehicle door 22 at the exit of the painting booth 10. The door lock device 24 has a bracket 26 therein. The bracket 26 comprises a cylindrical member 28 and a pair of legs 30 and 32 which downwardly extend from the cylindrical member 28 to the vehicle door 22. The legs 30 and 32 of the bracket 26 are mounted on the vehicle door 22 in such a condition as the legs 30 and 32 fit into a slot 34 through which a side windshield slides upwardly and downwardly by a passenger's operation. The door lock device 24 is mounted on the vehicle door 22 at the position of a free end portion of the body of the door 22 (the most distant portion from a door hinge). The cylindrical member 28 almost horizontally extends after the cylindrical member 28 is mounted on the vehicle door 22. A lock bar 36 is axially slidable within the cylindrical member 28. The axial ends of the lock bar 36 project outwardly through openings which are provided in each of the end plates of the cylindrical member 28. The lock bar 36 has an enlarged portion 47 at longitudinal intermediate portion thereof. A spring 38 is provided between the enlarged portion 47 and one end of the cylindrical member 28. The spring 38 biases the lock bar 36 toward a first position where a rear end of the lock bar 36 (the right end in FIG. 3) projects from the cylindrical member 28 to the rear of the vehicle, as shown in FIG. 3. When the lock bar 36 is positioned at a first position, the lock bar 36 is positioned at such a position as the lock bar 36 can engage with an inner part of a center pillar 40 of the vehicle body 14, as shown in FIG. 3. In this condition, the vehicle door 22 is inhibited to more widely open than a predetermined small angle l defined between the lock bar 36 and the outer surface of the vehicle door 22.

An engagement member 42 is fixed to the lock bar 36. This engagement member 42 is manufactured in such a process that a round shaft is bent and then is fixed by a welding to another portion thereof. The actuating member 42 has a L-shaped leg portion 46 which is fitted into a slot 48 of the bracket 26 and secured to the lock bar 36, and an opening 44 is defined among the engagement member 42. The leg portion 46 of the member 42 fits into the slot 48 which longitudinally extends in a parallel relationship to the longitudinal axis of the cylindrical member 28, and is secured to the lock bar 36 at the fitted rear portion thereof. The leg portion 46 of the member 42 fits into the slot 48 which is provided within the cylindrical member, and prevents the lock bar 36 from being rotated around its longitudinal axis thereof. Hence, the rear end of the lock bar 36 (the right side in FIG. 3) is maintained in an accurate direction. The opening 44 within the member 42 has a uniform width at a rear end portion thereof (the right side in FIG. 3), and its radial width L gradually decreases as the point moves to the forward (the left side in FIG. 3). The opening 44 within the member 42 is a shape of a trapezoid.

Figure 4:
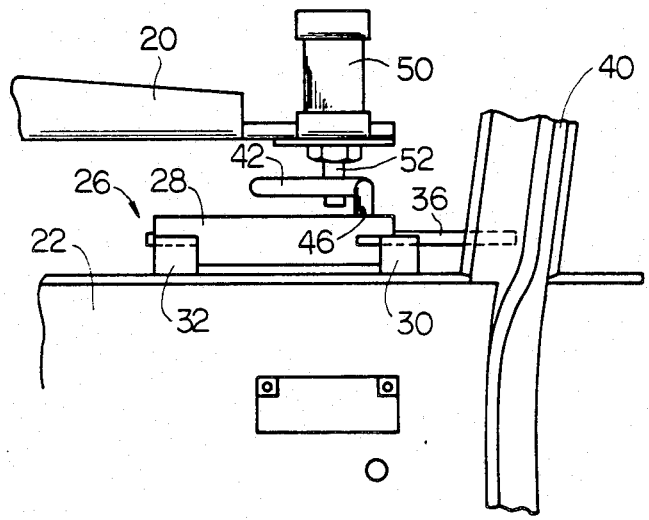
FIG. 4 is an elevational view of the door lock device shown in FIG. 3 and of a part of an actuating device.

An air cylinder 50 is fixed onto a position thereof adjacent to a tip end of the arm 20 in such a condition as the longitudinal direction of the air cylinder 50 downwardly points, as shown in FIG. 4. A piston rod 52 is provided at the under surface of the air cylinder 50, and is positioned to fit into the opening 44 within the member 42. The opening 44 has a quite larger square than the cross-sectional square of the piston rod 52. There is provided a clearance between the piston rod 52 and the inner peripheral portion of the opening 44, whose distance is designed to be greater than that corresponding to an estimated maximum error distance which is defined at its location between the piston rod 52 and the inner peripheral portion of the opening 44. Hence, the arm 20 moves to the predetermined position, and the air cylinder 50 actuates, according to the stored order. The piston rod 52 can securely fit into the opening 44.

In operation of the above-described apparatus, after the door lock device 24 is mounted on the vehicle door 22 of the vehicle body 14 and the conveyor 12 intermittently stops the vehicle body 14 at a predetermined position, the piston rod 52 of the air cylinder 50 can lift up to a higher position than the upper surface of the engagement member 42. If the air cylinder 50 is actuated, the piston rod 52 fits into the opening 44 of the member 42. Subsequently, the arm 20 actuates to shift the piston rod 52 to the left in FIG. 3. According to this shift of the piston rod 52, the piston rod 52 moves within the opening 44 to the left in FIG. 4, resulting in contacting on a front end of the opening 44 whose width is the narrowest. If the piston rod 52 further moves to the left in FIG. 3 after the piston rod 52 contacts on the member 42, the lock bar 36 is also moved through the engagement member 42 to the left in FIG. 3, thereby reaching a second position where the lock bar 36 does not engage with the center pillar 40. Subsequently, the arm 20 operates to open the vehicle door 22, according to the stored program. The operation of the arm 20 is transmitted through the lock bar 36 and the bracket 26 to the vehicle door 22, thereby resulting in the opening of the vehicle door 22 by a predetermined angle. When the vehicle door 22 opens, the opened position of the vehicle door 22 is accurately controlled because the piston rod 52 contacts the member 42 at the narrowest portion of the opening 44. Further, as the member 42 is mounted on the vehicle door 22 at the position close to the rear end of the vehicle door 22 (the right end of the vehicle door 22 in FIG. 3), the opened position of the vehicle door 22 is accurately controlled. If the member 42 is mounted on the vehicle door 22 at the position close to a door hinge, the difference in the distance between the predetermined position and the actual position, is enlarged as the point moves to the rear portion of the vehicle door 22.

The vehicle door 22 opens in the above-described way, and the painting robots 12 paint a part of the vehicle body 14 around the vehicle door 22. Subsequently the arm 20 operates to close the vehicle door 22. As a result, the piston rod 52 operates to close the vehicle door 22 up to the predetermined position, and the lock bar 36 moves from the second position to the first position with the biasing force of the spring 38, thereby allowing the lock bar 36 to be engaged with the center pillar 40. The lock bar 36 moves to the right in FIG. 3 within the opening 44. In this condition, the air cylinder 50 operates to upwardly contract the piston rod 52. Subsequently, the piston rod 52 is disengaged from the opening 44, and the arm 20 returns to the initial position where the arm 20 is away from the vehicle body 14. Thus, the entire operation is made.

Figure 5:
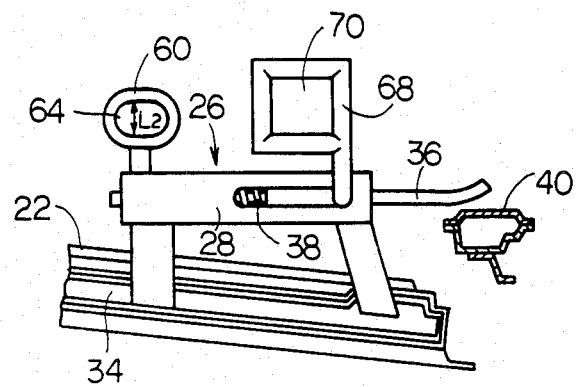
FIG. 5 is a plan view illustrating a door lock device which is employed in an apparatus according to a second embodiment of the present invention.
Figure 6:
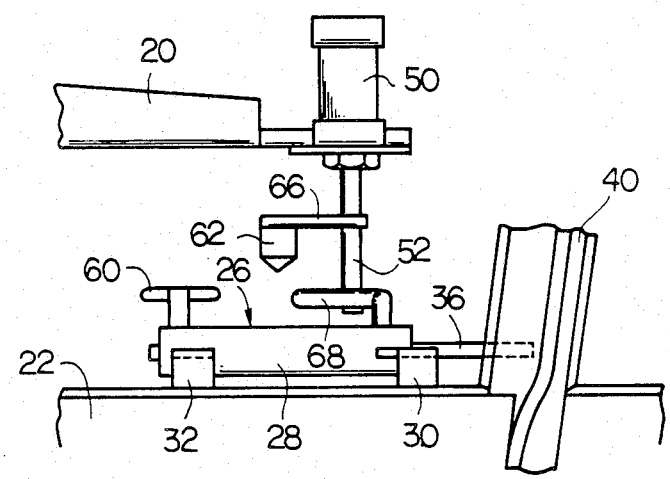
FIG. 6 is an elevational view of the door lock device shown in FIG. 5 and of a part of an actuating device.
Figure 7:
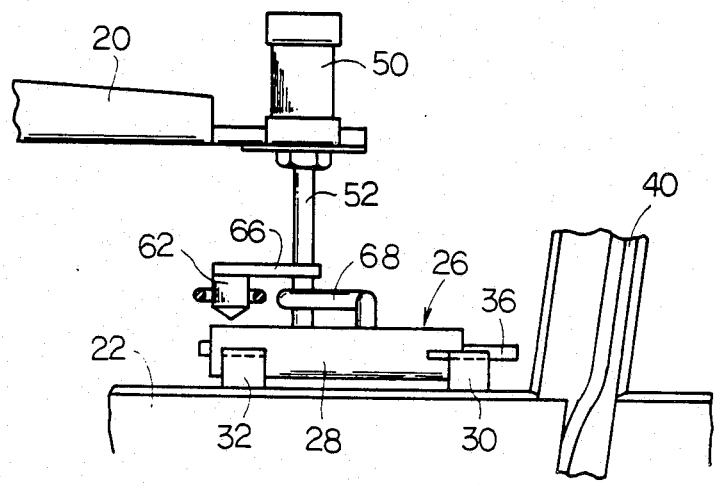
FIG. 7 is an elevational view of the door lock device shown in FIG. 6, which is positioned at a different condition from that shown in FIG. 6.
Figure 8:
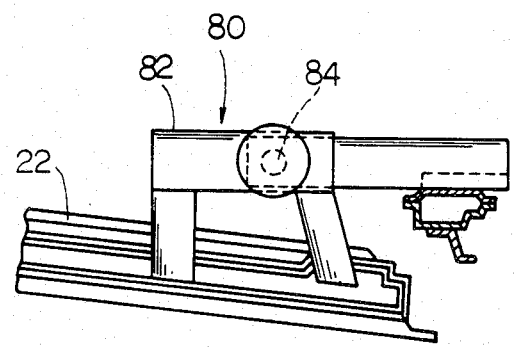
FIG. 8 is a plan view illustrating a door lock device which is employed in an apparatus according to a third embodiment of the present invention.

FIGS. 5 to 7 show an apparatus according to the second embodiment of the present invention. The apparatus according to the second embodiment is constructed such as an actuating member 60 and a pin 62 are added to the apparatus according to the first embodiment of the present invention. The member 60, as shown in FIG. 5, has an opening 64 therein which is long in a parallel relationship to the longitudinal direction of the lock bar 36. The member 60 is fixed to the bracket 26. The pin 62 extends in a parallel relationship to the piston rod 52 of the air cylinder 50. The pin 62 is connected through a member 66 to the piston rod 52. The diameter of the pin 62 is designed to be slightly smaller than that of the width L2 of the opening 64, as shown in FIG. 5. The pin 62 has a lower portion of a conical form which performs a function as a guide member. An actuating member 68 is fixed to the lock bar 36, and has an opening 70 therein of a square form as shown in FIG. 5. The air cylinder 50 operates the piston rod 52 so that the piston rod 52 may extend by the different two strokes. FIG. 6 is shown at a first stroke of the piston rod 52. FIG. 7 is shown at a second stroke of the piston rod 52. Other construction of the apparatus according to the second embodiment is same as that of the apparatus according to the first embodiment.

In operation of the apparatus according to the second embodiment the piston rod 52 fits into the opening 70 within the member 68, as shown in FIG. 6. The arm 20 moves the lock bar 36 from the first position shown in FIG. 5 where the lock bar 36 can engage with the center pillar 40 of the vehicle body 14 to the second position shown in FIG. 7 where the lock bar 36 cannot engage with the center pillar 40. Thus, the lock bar 36 is released. Next, the piston rod 52 further extends into the opening 70 within the member 68, and the pin 62 fits into the opening 64 within the member 60. When the pin 62 fits into the opening 64 within the member 60, the pin 62 can fit into the opening 64 by utilizing the guide by the conical lower portion of the pin 62 even if the member 60 is positioned at a slightly different point from that of the pin 62. When the member 60 is positioned at a slightly different point from that of the pin 62, the position of the member 60 is adjusted by the pin 62. In this circumstance, as the door lock by the lock bar 36 is released, the vehicle door 22 can be rotated by a small angle with the adjustment of the position of the member 60. Hence, an excessive force does not operate between the member 60 and the pin 62. If the pin 62 is positioned at a different point from that of the member 60 in the longitudinal direction of the vehicle (the right and left direction in FIG. 5), the elongated opening 64 allows this adjustment of the position of the pin 62. Subsequently, the arm 20 operates the vehicle door 22 through the member 60 and the bracket 26, thereby opening the vehicle door 22. At this opening, the movement of the arm 20 is accurately regulated because there is provided only a small lateral clearance between the pin 62 and the member 60, in the direction perpendicular to the longitudinal direction of the lock bar 36. Hence, the opened position of the vehicle door 22 can be accurately regulated. During the vehicle door's opening, the painting robot paints the portion around the vehicle door 22. Subsequently, the arm 20 and the air cylinder 50 do the reverse order of the door opening movement, thereby resulting in the closing movement of the vehicle door. The lock bar 36 engages with the center pillar 40 of the vehicle body 14. Thus, the entire operation is accomplished.

Figure 9:
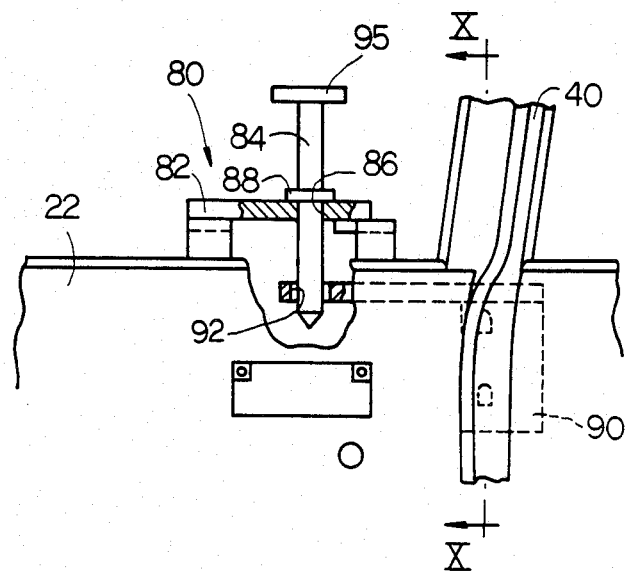
FIG. 9 is a partial broken view of the door lock device shown in FIG. 8.
Figure 10:
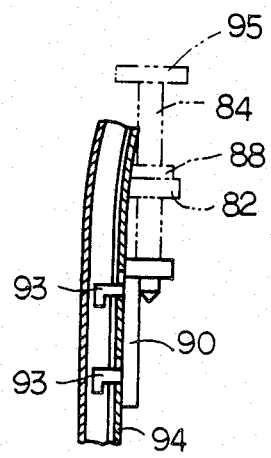
FIG. 10 is a cross-sectional view taken along the line X—X in FIG. 9.
Figure 11:
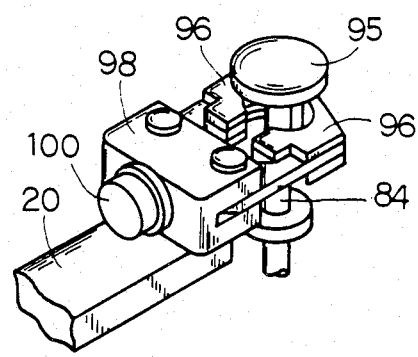
FIG. 11 is a perspective view of the door lock device shown in FIGS. 8 through 10.

FIGS. 8 to 11 show an apparatus according to the third embodiment of the present invention. A door lock device 80 is mounted on the vehicle door 22 through a bracket 82, as same as the apparatuses according to the first and second embodiments. The difference of the apparatuses between the third embodiment and other embodiments is that a lock pin 84 according to the third embodiment moves downwardly and upwardly. As shown in FIG. 9, the lock pin 84 comprises a round shaft, and is inserted into an opening 86 defined within the bracket 82 in such a condition as the lock pin 84 can slide downwardly and upwardly within the opening 86. The lock pin 84 is downwardly biased by its weight, and the lower limit position of the lock pin 84 is regulated by such an adjustment as a flange 88 formed on a longitudinally intermediate portion of the lock pin 84 sits on the upper surface of the bracket 82. The lock pin 84 is designed to fit into an opening 92 defined within a jig 90 when the lock pin 84 is positioned at the lower limit position. The jig 90 has a plural number of L-shaped hooks 93, as shown in FIG. 10. The hooks 93 are designed to insert into apertures defined in an inner side face of a main door frame 94. By dismounting the hooks 93 from the apertures, it is possible to detach the jig 90 from the main door frame 94. When the lock pin 84 fits into the opening 92 of the jig 90, the vehicle door 22 cannot be opened. This is the first position of the lock pin 84. The lock pin 84 has an enlarged head portion 95 at its upper end. The head portion 95 is designed to engage with a rotable pawl 96 shown in FIG. 11. The pawl 96 is mounted on a bracket 98 fixed on the tip end of the arm 20 to be rotated around an axis perpendicular to the longitudinal axis of the lock pin 84. The pawl 96 is opened or closed by an air cylinder 100. When the pawl 96 is opened, the head portion 95 of the lock pin 84 is allowed to be slided upwardly and downwardly (the longitudinal axial direction of the lock pin 24). Contrary to this, when the pawl 96 is closed, the head portion 95 of the lock pin 84 is not allowed to be slided. Even when the pawl 96 is closed, the pawl 96 does not grasp the lock pin 84. Even in this condition, there is provided a predetermined clearance in the radial direction between the lock pin 84 and the pawl 96, and only encircles the lock pin 84 with some clearance. This radial clearance is selected to be greater than that of the estimated maximum error distance formed between the vehicle body 14 and the actuating device 18. According to the apparatus of the third embodiment, a worker mounts the bracket 82 and the jig 90 on the vehicle body 14 at the entrance of the painting booth. When the vehicle body 14 is stopped at a predetermined position within the painting booth 10, the arm 20 moves the lock pin 84 and subsequently moves the lock pin 84 downwardly. In this condition, as the pawl 96 is opened, the pawl 96 does not engage with the head portion 95 of the lock pin 84. When the pawl 96 is moved to the lower position than that of the head portion 95 of the lock pin 84, the air cylinder 100 operates to close the pawl 96. As a result, the pawl 96 is positioned at such a position as the pawl 96 can be engaged with the head portion 95 of the lock pin 84, but the pawl 96 does not engage with the lock pin 84 as there is provided a radial clearance between the pawl 96 and the lock pin 84.

Next, when the arm 20 lifts up, the pawl 96 is engaged with the head portion 95 of the lock pin 84, thereby lifting up the lock pin 84. As a result, the lock pin 84 is separate from the opening 92, and the vehicle door 22 can be opened. Hence, if the arm 20 operates the vehicle door 22, this operation is transmitted through the pawl 96, the lock pin 84 and the bracket 82 to the vehicle door 22, resulting in the opening of the vehicle door 22. After the vehicle door 22 is opened, the painting is made around the vehicle door 22. The arm 20 and the air cylinder 50 do the converse operation of the door opening operation, thereby resulting in the vehicle door 22 being closed. The lock pin 84 is fitted into the opening 92 within the jig 90, thereby resulting in the vehicle door 22 being locked. Further, according to the apparatus of the third embodiment of the present invention, the pawl 96 is designed to close at the two different stages. When the pawl 96 is closed a half, the locking and door opening operations are done. If the pawl 96 is closed while the door 22 opens, the opened position of the vehicle door 22 is accurately regulated.

The typical embodiments of the present invention are described above in conjunction with the accompanying drawings, and the present invention may be otherwise embodied.

For instance, in the apparatus according to the third embodiment, as shown in FIGS. 8 to 11, a connecting member may be provided between the bracket 82 and the arm 20, for connecting the pawl 96 with the lock pin 84 when the lock pin 84 is separate away from the opening 92. If the operation of the door opening is transmitted from the arm 20 to the vehicle door 22 through the connecting member, the vehicle door 22 will be acurately opened.

According to the apparatus of the third embodiment, the pawl 96 to be opened and closed is employed as a member which is engaged with the head portion 95 of the lock pin 84. In this case, the arm 20 can actuate only a simple operation. If the arm 20 can actuate a complicated operation, a yoke may be provided instead of the pawl 96. The yoke cannot be opened nor closed. The yoke is moved in the direction perpendicular to the longitudinal axis of the lock pin 84, and is located at the position vertically below the head portion 95 of the lock pin 84. Subsequently, the yoke is lifted up to engage with the head portion 95 of the lock pin 84, thereby enabling the lock pin 84 to be separately away from the opening 92.

All the apparatuses for opening and closing a vehicle door according to the present embodiments are employed in a painting process for painting the vehicle body in a manufacturing plant. Further, the apparatus according to the present invention may be employed in a different process, for opening and closing a vehicle door.

Further, the lock member according to all the embodiments is designed to move in its axial direction, but it is possible to rotate the lock member, thereby obtaining the door lock position and the door lock release position.

While the present invention has been described in its preferred embodiments, it is to be understood that the invention is not limited thereto, and may be otherwise embodied within the scope of the following claims.

What is claimed is:

1. An apparatus for automatically opening and closing a door of a vehicle body which is transferred through or stopped at a predetermined position by a transport means for conveying the vehicle body in a plant, said apparatus comprising:
a detachable device for controlling the amount of opening of a vehicle door, the device being detachably mounted on the door and including:
a lock member slidably mounted on the detachable device, the lock member being selectively positioned at a first position in which the lock member is in contact with the vehicle body to prevent the door from opening more than a predetermined amount, and a second position in which the lock member is not in contact with the vehicle body to allow the door to open beyond the predetermined amount; and
a biasing means for biasing the lock member toward the first position;
a first engagement member connected to the lock member at one end thereof; and
an actuating device located independently from and cooperating with said detachable device and lock member for selectively forcing the lock member of the detachable device to the second position, the actuating device being located in the vicinity of the transport means and the predetermined position, the actuating device including:
a second engagement member connected to the actuating device at one end thereof, the second engagement member selectively engaging the first engagement member, the second engagement member of said actuating device engaging the first engagement member of said detachable device and said actuating device forcing the lock member of said detachable device to the second position to open the door more than the predetermined amount, said detachable device preventing the door from being opened more than the predetermined amount when said biasing means forces the lock member of said detachable device to the first position.

2. The apparatus of claim 1, wherein said detachable device further comprises a bracket.

3. The apparatus of claim 2, wherein the vehicle body has a center pillar, and the lock member of said detachable device comprises a shaft which is generally horizontal, the shaft being mounted on the bracket to be slidable in longitudinal direction thereof, and the shaft projecting from the bracket, whereby when the lock member is positioned at the first position, the shaft can be engaged with the center pillar of the vehicle body and the shaft prevents the door from being opened more than the predetermined amount.

4. The apparatus of claim 1, wherein the second engagement member of said actuating device is positioned selectively at one end of a third position in which said first engagement member surrounds and is spaced from said second engagement member, and a fourth position in which said first and second engagement members are in contact, whereby when the second engagement member of said actuating device is positioned at the fourth position, the second engagement member engages the first engagement member of said detachable device.

5. The apparatus of claim 4, wherein the first engagement member of said detachable device has an opening therein, and the second engagement member of said actuating device extends from said actuating device and into the opening of the first link with some clearance, whereby when the second engagement member of said actuating device is positioned at the fourth position, the second engagement member is inserted into the opening of the first engagement member and in contact therewith.

6. The apparatus of claim 5, wherein the second engagement member is a piston rod of a hydraulic cylinder fixed on an under surface of said actuating device.

7. The apparatus of claim 1 wherein the predetermined position has a maximum error distance defined as the distance between the predetermined position of the vehicle body and an actual position of the vehicle body at which the transfer means transfers or stops the vehicle body, the second engagement member engaging the first engagement member with a clearance greater than the maximum error distance so that the second engagement member engages the first engagement member if the position of the vehicle is within the maximum error distance.

8. An apparatus for automatically opening and closing a door of a vehicle body which is transferred through or stopped at a predetermined position in a transport means for conveying the vehicle body in a plant, comprising:

a detachable device for controlling the amount of opening of the door, the detachable device being detachably mounted on the door and including:

a lock member mounted slidably on said detachable device, the lock member being positioned selectively at one of a first position and a second position whereby when the lock member is positioned at the first position, the lock member is in contact with the vehicle body so that the door is prevented from opening more than predetermined amount, and when the lock member is positioned at the second position, the lock member is not contact with the vehicle body so that the door is allowed to open beyond the predetermined amount;

a bias means for forcing the lock member to the first position;

a bracket for mounting said detachable device on the door; and a first engagement member connected to the lock member at one end thereof; and an actuating device located independently from and cooperating with said detachable device and lock member for selectively forcing the lock member of said detachable device from the first position to the second position, the actuating device being located in the vicinity of the transport means and the predetermined position, said actuating device including:

a second engagement member connected to the actuating device at one end thereof and capable of assuming an actuated position and retracted position, the second engagement member contacting the first engagement member in the actuated position and being surrounded by and spaced from said first engagement member in the retracted position, whereby when the second engagement member of said actuating device engages with the first engagement member of said detachable device and said actuating device forces the lock member of said detachable device to the second position, said actuating device opens the door more than the predetermined amount, and said detachable device prevents the door from being opened more than the predetermined amount when said biasing means forces the lock member of said detachable device to the first position, and when the second engagement member of said actuating device is in the retracted position.

9. An apparatus for automatically opening and closing a door of a vehicle body which is transferred through or stopped at a predetermined position by a transport means for conveying the vehicle body in a plant, the predetermined position having a maximum error distance defined as the difference between the predetermined position and an actual position at which said transport means tranfers or stops said vehicle body, said apparatus comprising:

a detachable device for controlling the amount of opening of the vehicle door, the detachable device being removably mounted to the vehicle door and including: a lock member slidably mounted on the detachable device for selective positioning at a first position in which the lock member is in contact with the vehicle body to prevent the door from opening more than a predetermined amount, and a second position in which the lock member is not in contact with the body to allow the door to open beyond a predetermined amount; biasing means attached to said detachable device for biasing said lock member to the first position; and a first engagement member connected to the lock member at one end thereof; and an actuating device located independently from and cooperating with said detachable device and lock member for selectively forcing the lock member of the detachable device from the first position to the second position, the actuating device being located in the vicinity of the transport means and the predetermined position, and having an actuated position and a retracted position, the actuating device including: a second engagement member connected to the actuating device for engaging the first engagement member in the actuated position of said actuating device and for withdrawing from said first engagement member in the retracted position of the actuating device, the second engagement member engaging the first engagement member with a clearance greater than the maximum error distance so that the second engagement member engages the first engagement member if the position of the vehicle is within the maximum error distance.

* * * * *